United States Patent [19]

Alston et al.

[11] Patent Number: 5,412,753
[45] Date of Patent: May 2, 1995

[54] EXPERT SYSTEM CAPABLE OF MEETING REAL TIME CONSTRAINTS

[75] Inventors: Andrew Alston, Bourg-La Reine; Jean-Michel Delory, Levis St Nom; Marc Gandara, Paris; Hassan Laasri, Arpajon, all of France

[73] Assignee: Alcatel N.V., Amsterdam, Netherlands

[21] Appl. No.: 982,311

[22] Filed: Nov. 27, 1992

[30] Foreign Application Priority Data

Nov. 29, 1991 [FR] France ................... 91 14859

[51] Int. Cl.⁶ .............. G08C 25/00; G06F 15/20; H04B 17/00
[52] U.S. Cl. .................... 395/12; 395/11; 395/916; 395/917
[58] Field of Search .......... 395/12, 916, 917, 575, 395/650, 11, 51, 54, 77; 371/16.1, 18

[56] References Cited

U.S. PATENT DOCUMENTS

| | | | |
|---|---|---|---|
| 4,881,230 | 11/1989 | Clark et al. | 395/917 |
| 4,888,771 | 12/1989 | Benignus et al. | 371/16.5 |
| 4,967,337 | 10/1990 | English et al. | 371/16.5 |
| 4,972,453 | 11/1990 | Daniel, III et al. | 371/15.1 |
| 5,090,014 | 2/1992 | Polich et al. | 371/16.1 |
| 5,212,768 | 5/1993 | Itsuki et al. | 395/54 |

OTHER PUBLICATIONS

Kopeikina et al., "Case Based Reasoning for Continuous Control", Proc. Workshop on Case-Based Reasoning, May 1988, 250–259.

AI-Assisted Telecommunications Network Management; Covo et al.; GLOBECOM '89 IEEE Global Telecommunications Conference and Exhibition; 27–30 Nov. 1989; pp. 487–491; vol. 1.

An Object-Oriented Troubleshooting Expert System for Electronic Swithing Systems; Hibino et al.; GLOBECOMM '89 IEEE Global Telecommunications Conference and Exhibition; 27–30 Nov. 1989; pp. 475–479; vol. 1.

Neopilot; An Integrated ISDN Fault Management System; Shimazaki et al.; GLOBECOMM '90 IEEE Global Telecommunications Conference and Exhibition; 27–30 Nov. 1989; pp. 1503–1507; vol. 3.

OPERA—An Expert Operations Analyst for a Distributed Computer System; Adler et al.; Proc. of the Annual AI Systems in Government Conf.; 27–31 Mar. 1989; pp. 179–185.

Rabie, S., "Applications of Expert Systems to Network Surveillance", *Network Management and Control*, 19 Sep. 1989, pp. 249–262.

(List continued on next page.)

*Primary Examiner*—Robert W. Downs
*Attorney, Agent, or Firm*—Robbins, Berliner & Carson

[57] ABSTRACT

An expert system capable of meeting real time constraints for solving a problem on the basis of a flow of input messages concerning the operation and the status of a network of machines, this status changing with time, includes a filter module detecting in real time significant events on the basis of input messages, each significant event being a manifestation of a problem, as judged by a human expert. A database stores all input messages, the significant events defined by the filter module, intermediate data produced by the expert system, data constituting a model of the network of machines and archives relating to problems processed previously, whether solved or not. A reasoning module comprises a set of rules divided into a plurality of subsets called specialists and each comprising knowledge provided by a human expert required to process part of a problem, specialists being capable of executing in parallel without blocking each other, and a command system for selecting and executing specialists according to heuristic rules provided by a human expert and making a decision or declaring that a decision is impossible at the end of a predetermined time period in respect of a problem represented by significant events communicated to the reasoning module by the filter module. A graphical interface is provided for human/expert system communications. An expert assistant module supplies a human expert with data stored in the database.

4 Claims, 5 Drawing Sheets

OTHER PUBLICATIONS

Oliveiria, E. et al., "Controlling Cooperative Experts in a Real Time System", *3rd Int. Conf. on Software Engineering for Real Time Systems*, 16 Sep. 1991, pp. 176–181.

De Feyter, A. R., "RTEX: And Industrial Real-Time Expert System Shell", *10th Int. Workshop, Expert Systems and Their Applications*, 28 May 1990, pp. 231–252.

Klein, P. et al., "Error Analysis Expert System in a Telephone Exchange", *11th Int. Conf. on Expert Systems and Their Applications*, 27 May 1991, pp. 77–90.

EXPERT SYSTEM CAPABLE OF MEETING REAL TIME CONSTRAINTS

BACKGROUND OF THE INVENTION

1. Field of the Invention

The invention concerns an expert system capable of meeting real time constraints to take decisions based on a flow of incoming messages concerning the operation and the status of a network of machines whose status changes with time. The decisions may be applied automatically by the network of machines or may constitute a decisionmaking aid for a human expert. These two applications are complementary if the expert system encounters problems which it is not able to solve. The decisions must then be taken by a human expert but an expert system can provide invaluable help by carrying out a preliminary analysis of the problems.

2. Description of the Prior Art

The invention is concerned in particular with telecommunication network management and maintenance. The software currently used in telecommunication network management merely shows the behavior of the network by displaying alarms and the results of counts representing the respective load of each link. Management decisions and the resultant actions are the domain of a human expert.

In the field of telecommunication network maintenance it is known to use a maintenance network to centralize maintenance data produced by local maintenance software run in each switching center. This software comprises fault detecting software, periodic test software and fault locating software. The software is run either automatically or by an operator if a fault is detected.

Independent test means test the links providing the connections to the switching centers.

Local maintenance software can identify most hardware unit failures. However, this software is relatively ineffective in the case of intermittent faults or problems which are caused by slow deterioration of the hardware. For this reason it cannot provide preventive maintenance. The designers of such software cannot foresee all possible faults. Some of the knowledge needed to locate difficult faults can be acquired only through experience.

Conventional expert systems solve a problem on the basis of a fixed set of data, taking as much computation time as necessary. There may even be no limit on computation time. In the field of telecommunication network management and maintenance the expert system must make decisions on the basis of data which may even change while a decision is being made. A conventional expert system cannot handle these real time changes. A human expert must make decisions instead of the expert system if the latter is not able to make a decision, but the human expert may be swamped by a mass of data from the network of greater or lesser significance.

An object of the invention is to propose an expert system capable of solving in real time telecommunication network management and maintenance problems and capable of aiding a human expert to solve residual problems that the expert system cannot solve. This object must be achieved without modifying the existing software in the switching centers.

SUMMARY OF THE INVENTION

The invention consists in an expert system capable of meeting real time constraints for solving a problem on the basis of a flow of input messages concerning the operation and the status of a network of machines, said status changing with time, which system comprises:
- a filter module detecting in real time significant events on the basis of input messages, each significant event being a manifestation of a problem, as judged by a human expert;
- a database storing: all input messages, the significant events defined by the filter module, intermediate data produced by the expert system, data constituting a model of the network of machines and archives relating to problems processed previously, whether solved or not;
- a reasoning module comprising:
  - a set of rules divided into a plurality of subsets called specialists and each comprising knowledge provided by a human expert required to process part of a problem, specialists being capable of executing in parallel without blocking each other;
  - command means for selecting and executing specialists according to heuristic rules provided by a human expert and making a decision or declaring that a decision is impossible at the end of a predetermined time period in respect of a problem represented by significant events communicated to said reasoning module by said filter module;
- a graphical interface for human/expert system communications;
- an expert assistant module for supplying a human expert with data stored in said database.

This expert system is capable of meeting real time constraints for two reasons:
- Filtering of significant events is split off from reasoning. Reasoning is extremely time consuming but is not applied to all of the stream of input messages. Filtering is applied to all input messages and can be carried out by a simple and fast process. The filter module significantly reduces the number of events to be processed, discriminating in real time between input messages which represent a significant event and input messages which do not represent a significant event, on the basis of knowledge supplied by human experts.
- Parallel reasoning on different subproblems by means of specialists which can execute without blocking each other to process multiple different problems in parallel. At the end of a predetermined time period the control means collect the results, if any, of the reasoning carried out by each specialist. They therefore supply either a decision or a declaration that a decision is impossible at the end of finite time period, even if one or more specialists are in a position to continue reasoning for a very long time.

Specific implementations of the invention are claimed in claims 2, 3 and 4.

The invention will be better understood and other details will emerge from the following description given by way of example of one implementation relating to telecommunication network maintenance and from the appended drawings.

DETAILED DESCRIPTION OF THE INVENTION

Figure 1:
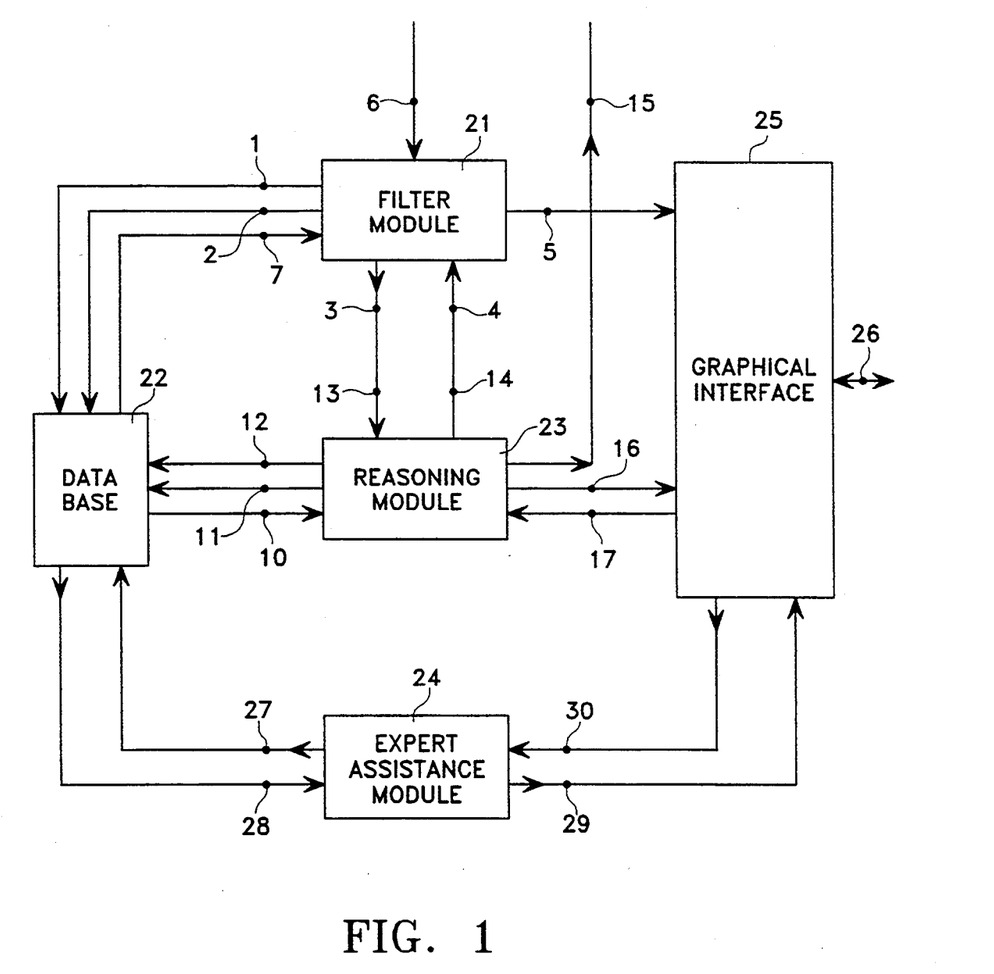
FIG. 1 is a diagram showing the architecture of one embodiment of an expert system in accordance with the invention.

FIG. 1 is a diagram showing the architecture of one embodiment of an expert system in accordance with the invention applied to telecommunication network maintenance. It is installed in a machine constituting a node of a conventional maintenance network associated with the telecommunication network. This embodiment comprises:

- a filter software module 21;
- a database 22, preferably an "object-oriented" database;
- a reasoning software module 23;
- an expert assistant software module 24; and
- a graphical interface 25.

The filter module 21 has an input 6 connected to the telecommunication network to received a stream of input maintenance messages usually representing faults detected by the switching centers of the telecommunication network. The module 21 has an output 1 connected to an input of the database 22 for writing into the latter all the input messages, after appropriate formatting, and data produced by the module 21 referred to hereinafter as significant events. Each significant event is the manifestation of an at least potential problem. In this instance a problem is a hardware failure; a potential problem is an intermittent fault or degraded network performance, which probably prefigures a hardware failure. In this latter case a preventive repair may prevent a hardware failure occurring later.

Another output 2 of the module 21 is connected to the database 22 to write therein "stamps" respectively associated with each significant event and designating a problem. An output 3 of the module 21 is connected to an input of the reasoning module 23 to supply the significant events to it. An output 5 of the module 21 is connected to an input of the graphical interface 25 to supply significant events and problem stamps to it, as and when they are created. An input 4 of the module 21 receives commands from an output of the reasoning module 23. An input 7 of the module 21 is connected to an output of the database 22.

Some messages in the stream of maintenance messages arriving at the input 6 of the filter module 21 can and must be processed immediately whereas others are not meaningful if considered in isolation. It is therefore impossible to define a priori the importance of each type of maintenance message, as their importance depends on the context, i.e. the other messages arriving simultaneously or in an adjacent time period. Nor is it possible, when designing the expert system, to predict all combinations of messages arriving at the input 6 of the module 21. However, a human expert can interpret the number of occurrences of a particular message during a given time interval. A human expert can decide that n or more occurrences of a message of type X is a significant event in the context of a problem P and that this event may contribute to identifying and solving the problem.

This knowledge of a human expert is applied by the module 21 to filter the maintenance messages. The process preferably employed entails counting all messages of a given type or of one of several given types which reach the module 21 during a sliding time period of fixed duration and comparing the count result with a threshold value determined by the human expert as constituting a significant event on the basis of their experience and theoretical knowledge. This technique for filtering significant events can be applied in real time because it is particularly simple. Other simple techniques for applying the knowledge of a human expert could be used, in addition to counting.

The module does not establish any correlation between events, to avoid increasing the processing time at the module 21. Correlations are established by the reasoning module 23, at which a longer processing time is acceptable. On the other hand, the module 21 creates links between significant events potentially related to a common problem.

It associates with each significant event a stamp which is different for each new potential problem, that is to say each time that the threshold value is exceeded for one of the counts carried out. However, the reasoning module 23 can modify the stamps and associate the same stamp with different type messages which relate to a common problem (given the knowledge of the human expert) stored in the reasoning module 23.

The reasoning module 23 comprises an input 10 and two outputs 11, 12 respectively connected to an output and to two inputs of the database 22, an input 13 and an output 14 respectively connected to the output 3 and to the input of the filter module 21, an output 15 connected to the telecommunication network maintenance network, an output 16 connected to an input of the graphical interface 25 and an input 17 connected to an output of the graphical interface 25.

The module 23 attempts to establish a correlation between each significant event and a problem already being analyzed. It also seeks to propagate reasoning for solving each problem in a model of the telecommunication network in the form of a tree which is stored in the database 22. It comprises a set of rules supplied by human experts. This set is divided into subsets called specialists. Each can solve a problem or a subproblem, that is to say part of a problem. The distribution of the rules in the various specialists is independent of the hardware architecture of the switching center, which is modelled in the database 22. The specialists are activated according to the type of significant event received at the input 13. If one specialist succeeds in formulating a diagnostic and proposes a repair, this proposal is transmitted via the output 16 to the graphical interface 25 for presentation to a human expert or to repair personnel. If the repair personnel carries out a repair, this is supervised by the filter module 21 and the reasoning module 23, the latter being able to modify the filter parameters of the module 21, for example by supplying it with new threshold values via the output 14 connected to the input 4 of the module 21, in order to detect other significant events. The diagnostic and the repair may therefore comprise a plurality of successive phases using different filtering in the module 21.

The essential function of the expert assistant module 24 is to facilitate access by a human expert to all data regarded as relevant. The module 24 can be used:

to determine the overall status of the network, that is to say the problems which have been detected and solved by the expert system and the problems that have been detected but have not been solved by the expert system; and to monitor the consequences of maintenance action taken in the past.

The human expert is capable of carrying out a more refined and more comprehensive analysis than the expert system, by correlating various problems detected previously and various repair actions commanded previously by the expert system. Various repetitive faults can mask a more subtle fault in a part of the network not previously suspect. The expert system has a knowledge of most maintenance problems that may arise and can generally suggest repair action. In some cases, however, this knowledge is insufficient to decide upon a repair action or even to detect that a problem exists. In all these cases the expert assistant module 24 assists the expert by producing significant events and intermediate results that are much easier to interpret than the stream of messages arriving directly from the maintenance network. The action of the human expert naturally further consists in adding to the knowledge of the expert system by supplying it an additional specialist module and additional heuristic command rules each time that the human expert solves a problem that the expert system has not been able to solve.

The expert assistant module 24 comprises an output 27 and an input 28 respectively connected to an input and to an output of the database 22 and an output 29 and an input 30 respectively connected to an input and to an output of the graphical interface 25. The module 24 fetches from the database 22 data chosen to constitute a balance. This data is chosen in advance by human experts as being particularly relevant. The balance is transmitted to the interface 25 at the request of a human expert. The module 24 may be a conventional object-oriented database management system.

The graphical interface 25 has an input-output 26 connected to data processing terminals available to human experts and to repair personnel.

The following will now be described in more detail:
the filter module 21;
the reasoning module 23;
the database 22.

Figure 2:
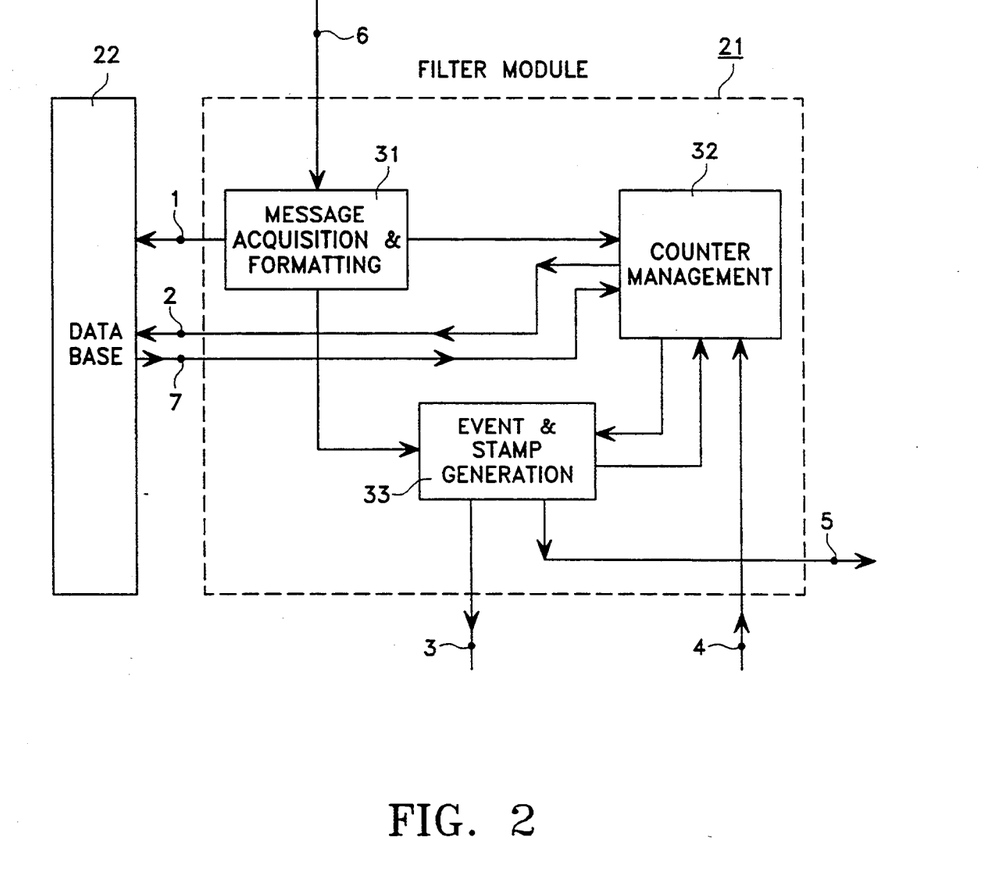
FIG. 2 is a diagram showing the architecture of a filter module of this embodiment.

FIG. 2 is a diagram showing the architecture of the filter module 21. It comprises a maintenance message acquisition and formatting software submodule 31; a message counter management software submodule 32; and a significant event and associated stamp generator software submodule 33.

The submodule 31 has one input connected to the input 6 of the module 21 to receive maintenance messages; a first output connected to the output 1 of the module 21 to write maintenance messages into the database 22; a second output connected to an input of the submodule 33 to supply the latter with formatted maintenance messages; and a third output connected to an input of the submodule 32 to tell it the type of each received message. The submodule 32 has: an input connected to the input 7 of the module 21 to receive data read in the database 22; an input connected to the input 4 of the module 21 to receive commands supplied by the reasoning module 23; an input connected to an output of the submodule 33 to receive the stamps produced by the submodule 33; and an output connected to an input of the submodule 33 to advise it of the detection of a meaningful event.

The submodule 31 formats as an object each message applied to the input 6 of the expert system indicating: a fault in a link or a switching center; a change of state, that is to say the putting into service or the taking out of service of a network element; or results transmitted by local maintenance software run at the initiative of the expert system to locate a fault, for example. The formatted messages are transmitted to the database 22 via the output 1 and to the submodule 33. Each message is written into the database 22 within a space associated with a register called a counter. Each counter register stores a count value which is the number of messages of a certain type or of certain types received during a sliding time period. This value is incremented by the counter management submodule 32. It is compared with a predetermined threshold value. If the threshold value is reached all messages stored in this space are read by the submodule 32 after which this space is deleted after which it is re-written into another location of the database 22. This other location is not associated with a counter register but with a stamp register. A problem stamp is written in this register and indicates that all messages stored in this other location constitute a significant event which is a manifestation of the problem denoted by the stamp. The counter register is reset to zero by the submodule 32.

Each significant event is detected by means of a counter and a comparator to count messages received by the counter during a sliding time period of predetermined duration. The message type to count, the duration of the sliding time period and the threshold value are chosen by the reasoning module 23 on the basis of predetermined rules drawn up by a human expert. A plurality of counters are used in parallel to detect different meaningful events corresponding to different problems or to absence of any problem, because the expert system is also used to verify that a repair has returned the telecommunication network to normal operation. These parameters are supplied at the input 4 of the module 32 by the reasoning module 23. The module 22 manages the counters of the module 33 on the basis of these parameters. The most relevant meaningful events vary according to the target problem. Consequently the reasoning module 23 selects certain types of messages, and not others, on the basis of significant events which are relevant to the processing in hand at the time.

Each time a new significant event enables the module 32 to conclude that a new potential problem has been detected it commands the module 33 to produce a new stamp value which is allocated to that problem and associated with all messages constituting the new significant event by the read-rewrite process mentioned above.

The output 5 of the module 21 supplies to the graphical interface 25 all significant events, changes of state, results of executing local maintenance software, count values and threshold values. This information is useful to the human expert even when the network is operating normally because it indicates the exact degree to which the telecommunication network is operating correctly.

Each significant event and the respective problem stamp are supplied by the submodule 33 at the output 3.

Specific input messages are received when the status of the telecommunication network changes and when the maintenance network supplies to the expert system the results of executing a fault locating program which was started up at the request of the expert system. These specific messages are also stored in the database 22, a specific stamp is associated with them and a significant event is produced by the module 33 and is then transmitted to the reasoning module 23 for analysis.

Figure 3:
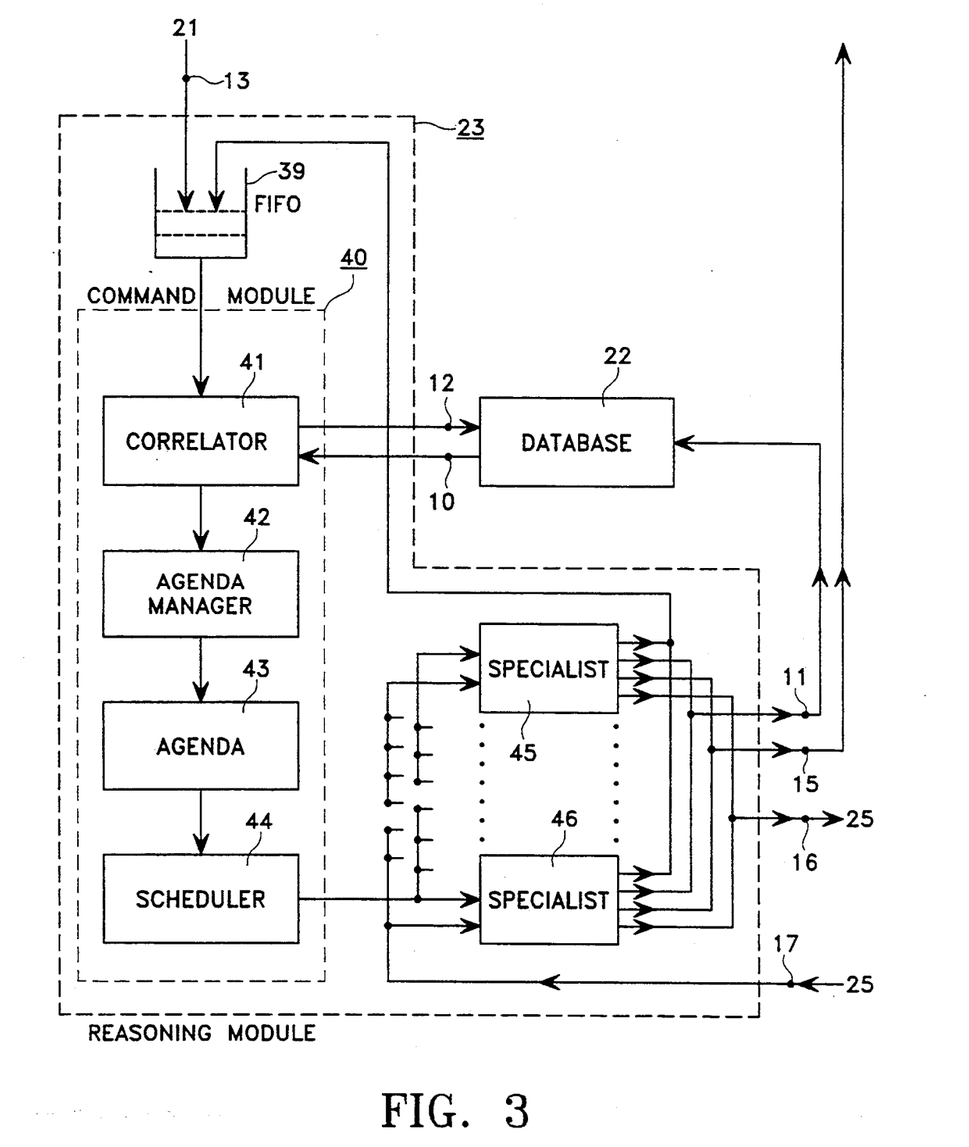
FIG. 3 is a diagram showing the architecture of a reasoning module of this embodiment.

FIG. 3 is a diagram showing the architecture of the reasoning module 23 in this embodiment. It comprises:
a first-in first-out memory 39;
a command software module 40;
a plurality of specialist software modules 45, . . . 46.

The memory 39 has a first data input constituting the input 13 of the module 23 which is connected to the filter module to receive significant events with their respective associated stamps, a second data input receiving messages sent by specialists 45, . . . , 46 and a data output connected to an input of the command module 40.

All the specialists 45, . . . , 46 have a common input connected to a first output of the command module 40 and another common input connected to the input 17 of the module 23 which is connected to the graphical interface 25. All the specialists also have an output connected to the output 11 of the module 23 which is connected to an input of the database 22, an output connected to the output 15 of the module 23 which is connected to the telecommunication network maintenance network, an output connected to the output 16 of the module 23 which is connected to an input of the graphical interface 25 and an output connected to the second data input of the memory 39.

There are two sorts of specialist: domain specialists and management specialists. The knowledge of human experts is divided between the domain specialists in such a way that each specialist has a role limited to the processing of part only of the problem detected by the occurrence of a significant event. A plurality of specialists are required simultaneously to process the various parts, called subproblems, of each problem. The specialists reason to locate a fault in the network by propagating their reasoning in a model of the telecommunication network stored in the database 22 in the form of a tree. This model is described later. The specialists comprise software written in an object-oriented language and in such a way that they can execute in parallel without blocking each other.

Collaboration between a plurality of specialists may be necessary to process a subproblem but the specialists do not call each other directly. The module 40 decides which specialists should execute and in which order.

Each specialist comprises two parts: a precondition part and an action part. The precondition part describes the situation in which the specialist can execute. The action part usually proposes a maintenance action such as taking a faulty unit of the telecommunication network out of service or replacing an interchangeable unit. Any such action has results in the form of change of state messages sent to the expert system by the telecommunication network via the maintenance network. The specialists store the result of this processing in the form of an object in the database 22 and transfer this result via the output 11 of the module 23. If the result of processing is to propose a command to take a faulty unit of the network out of service or to propose replacement of an interchangeable unit, this result is also transferred to the graphical interface 25 via the output 16 of the module 23 to advise a human expert or the repair personnel.

There are three management specialists:
A new problem specialist which creates a new object respective to a new problem.
A change of state and fault locating program result specialist which updates the data for processing a problem according to changes in the status of the telecommunication network and results supplied by local maintenance software started up by the expert system to locate faults.
An end of problem specialist whose function is archive storage in the form of an object in the database 22 of the data for processing a problem when the processing of the problem has been completed, whether the problem has been solved or not.

Figure 4:
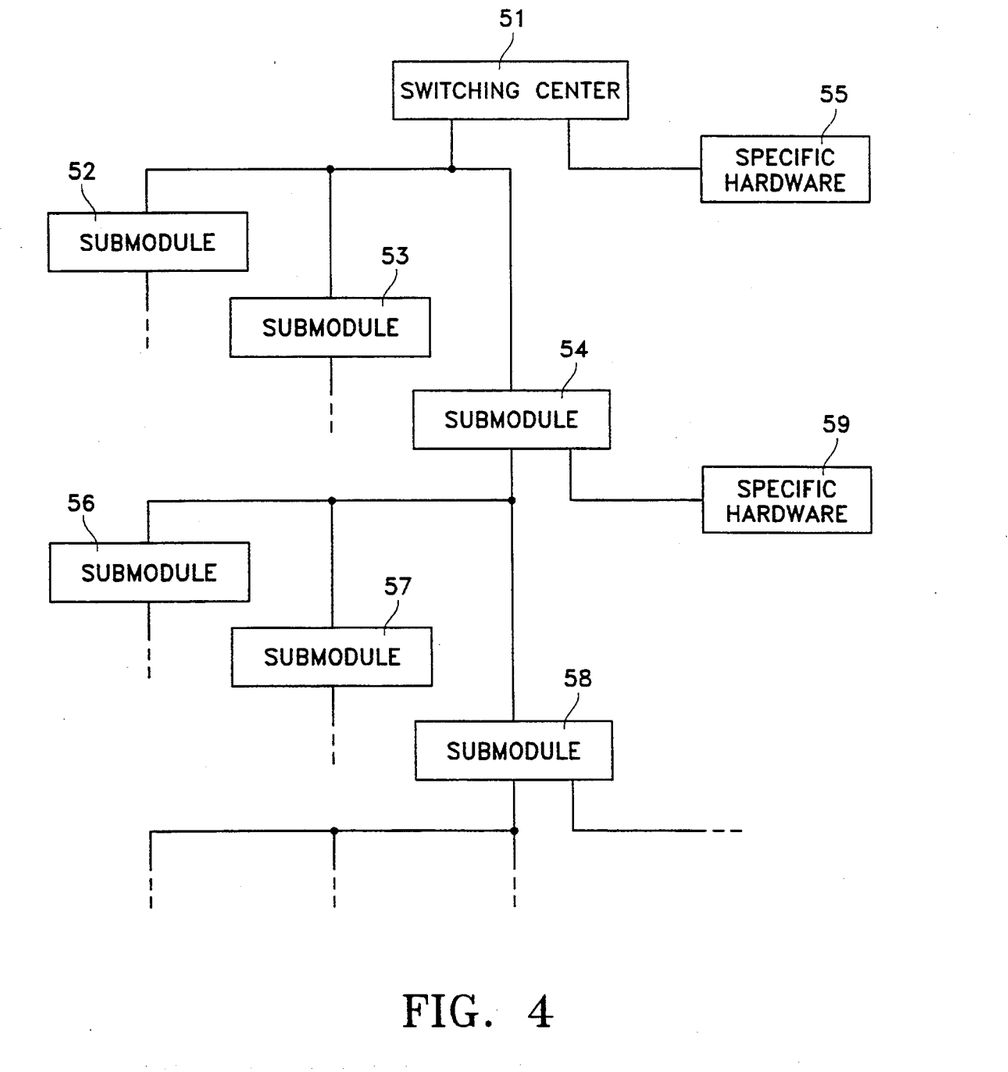
FIG. 4 shows the hardware structure of a switching center in the form of a tree, this model enabling a fault locating problem analysis to propagate as far as necessary to determine the faulty unit.

FIG. 4 is a diagram showing one embodiment of the switching center 51 of the telecommunication network for locating a fault causing a problem in the network. The model is preferably in the form of a tree. The switching center 51 is broken down into three submodules 52, 53, 54 and a specific hardware unit 55, for example. The specific hardware unit 55 differs from the submodules 53 through 54 because it cannot be broken down into smaller parts for more refined fault locating.

If a fault cannot be laid at the door of one of the submodules 52, 53, 54 the command module 40 concludes that the fault is due to the specific hardware unit 55. Each submodule 52, 53, 54 is in turn divided into multiple subsubmodules and a specific hardware unit. The submodule 54 is divided into three subsubmodules 56, 57, 58 and a specific hardware unit 59, for example. If a fault can be laid at the door at the submodule 54 the command module 32 uses the respective specialists to find out which subsubmodule 56 through 58 may fail in a way corresponding to the significant event. If the specialists conclude that the cause of the fault is not in any of the subsubmodules 56 through 58 the command module 40 concludes that the cause of the fault is in the specific hardware unit 59 and cannot take the analysis any further. Each of the subsubmodules 56 through 58 is in turn divided into smaller units for further refinement of fault locating by the expert system.

Consider in FIG. 3 the architecture of the command module 40. The function of the command module 40 is to correlate significant events and to associate them with problems already being analyzed, to determine which specialist is able to solve a subproblem and to start execution of these specialists, imposing an execution time limit. The module 40 comprises a correlator 41, an agenda manager 42, an agenda 43 and a scheduler 44. The correlator 41 has an input constituting the first input of the command module 32, an output connected to an input of the agenda manager 42 and an output constituting the output 12 of the reasoning module 23 which is connected to an input of the database 22. The agenda manager 42 has an input which is connected to an output of the correlator 41 and an output which is connected to an input of the agenda 43. An output of the agenda 43 is connected to an input of the scheduler 44. An output of the scheduler 44 constitutes the output of the module 40 which is connected to an input common to all the specialists 45, . . . , 46.

The function of the correlator 41 is to correlate significant events supplied to it successively by the memory 39. It therefore links together events which are caused by the same hardware fault given that the final objective is to detect and repair a hardware fault. A single hardware fault may cause several types of maintenance message to arrive simultaneously. The filter module 21 detects multiple significant events and then creates different problem stamps. The correlator 41 must therefore detect if the various problems detected have a common cause or not. To this end it applies predetermined heuristic rules supplied by human experts. The correlator 41 retains only one stamp for all interrelated events.

The correlator 41 reads in the database 22 all data associated with the stamps concerning the same fault. The correlator associates with them a single problem stamp. Other stamps previously allocated to this data are cleared. The correlator 41 supplies at the output 12 the processing data together with its new stamp for storage in the database 22 in place of the same data associated with the stamps previously assigned by the module 21.

The function of the agenda manager 42 is to determine one or more of the specialists 45, . . . , 46 able to process the problems detected by the module 21 and linked by the correlator 41. To this end a list of specialists who are potential candidates, as determined beforehand by a human expert, is associated with each type of significant message. Each significant event starts the execution of the precondition part of each specialist from the list associated with that significant event. If execution of the precondition part of a specialist shows that it can effectively be activated by a significant event, then this specialist is written into the agenda as effectively activatable. The function of the schedule 44 is to select successively in the agenda 43 the specialists which are activatable and then to start their execution. The specialists activatable for different problems may all be started up independently whereas specialists activatable for the same problem are started in a predetermined order. In particular, the management specialists are always started up before the domain specialists.

The specialists 45, . . . , 46 operate without blocking each other because the reasoning module 23 is a multiprocess type module comprising a filter module 21 implemented in one process and a command module 40 implemented in another. Each specialist 45, . . . , 46 is implemented by a separate process which is created and destroyed by the command module 40 as the analysis of the problems proceeds. The processes communicate with each other via the database 22 which they share and via the memory 39 which constitutes a first-in first-out queue for all messages addressed to the command module 32: the significant messages from the data module 21 and the messages from the specialists 45, . . . , 46.

The scheduler 44 prevents any process monopolizing the processor on which the expert system is implemented. At the end of a predetermined time period the scheduler 44 collects the results, if any, of reasoning by each specialist. It stops the processing even if some specialists could continue to reason for longer. The order in which problems are processed, chosen by the scheduler 44, is not necessarily the order in which the problems were detected and stamped by the module 21. Problems are therefore not necessarily solved in the order in which they arise in the telecommunication network. The scheduler 44 does not allocate different priorities to different processes.

If the expert system is heavily overloaded, that is to say if many problems are being solved in parallel, the process corresponding to the filter module 21 is not able to process all the maintenance messages sent by the telecommunication network maintenance network. Flow control implemented between the maintenance network and the telecommunication network can prevent loss of maintenance messages. These messages are then stored in a buffer in the maintenance network. They are analyzed once the overload has cleared. In theory overloads are rare because the preventive maintenance capability of the expert system limits the number of problems occurring simultaneously and because the multiprocessing architecture ensures that maintenance messages are processed as soon as possible after they are sent and that the expert system is not paralyzed by analyzing a particularly complex problem. The database 22 is object-oriented and the data is classified by problem, the problem stamp being used as an access key. This classification of the data enables it to be retrieved quickly and so contributes to enabling real time operation of the expert system.

The database 22 is managed by an object-oriented database management system. It contains the following data in the form of objects:

all input messages received by the expert system;

all significant events, that is to say the messages constituting a problem and a problem stamp;

the count values;

the successive states of the telecommunication network, with precise details as to the status of each hardware unit of the network;

the reasoning data used by the specialists 45, . . . 46 of the module 23, in particular the tree network model; and data for processing problems produced by the module 23 at the end of processing each problem.

Maintenance messages are divided into hierarchically ordered classes. The class at the top of the hierarchy has all characteristics common to all maintenance messages. The other classes are deduced from it by successive addition of characteristics. When it is received, each maintenance message is stored in the database as one instance of an object of each class.

The data for processing a problem comprises all information accumulating during the analysis of the problem. At any given time there are as many problem processing data objects as problem analyses in progress within the expert system. When the processing of a problem is completed the corresponding object is archive stored in the database 22 so that it is available if a human expert decides to carry out a more refined analysis of the problem. Each of these problem processing data objects is identified by the stamp specific to the problem. Each of these objects constitutes the root of a tree representing logical links between all data relating to the same problem.

Figure 5:
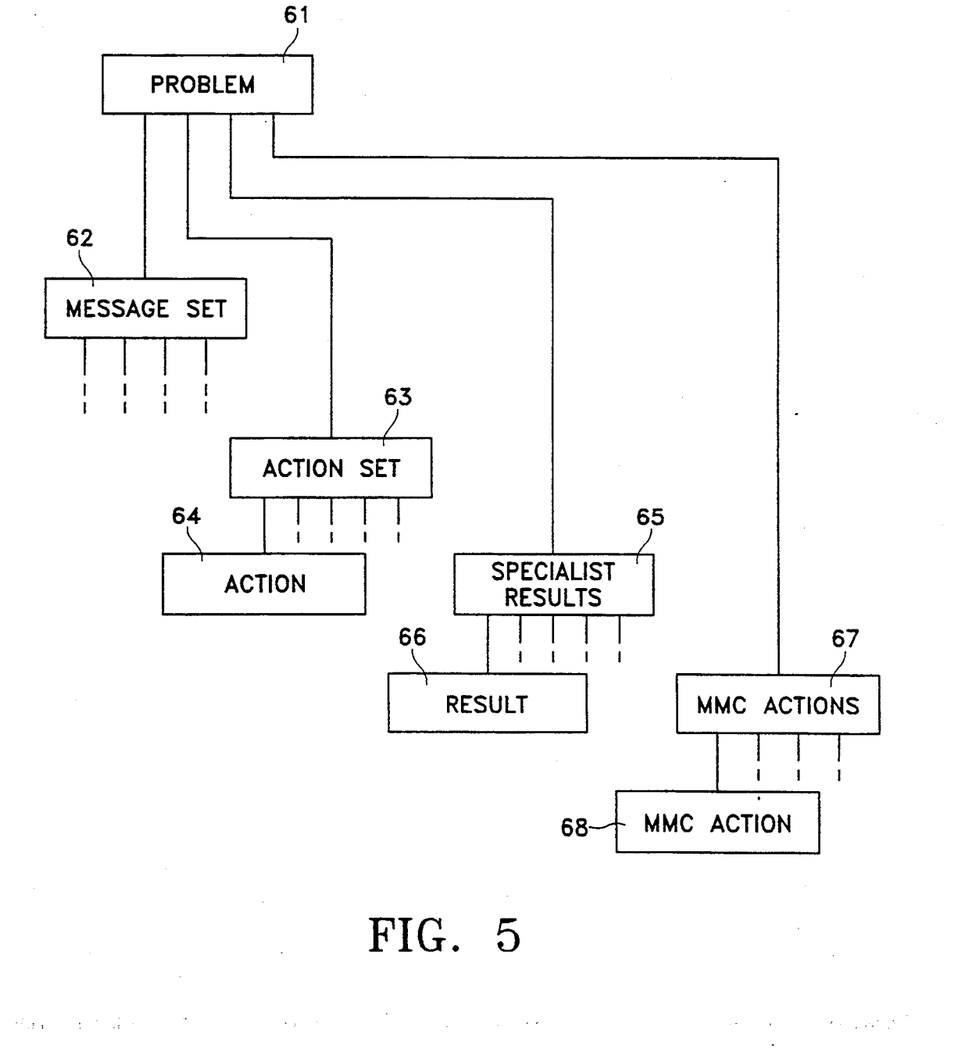
FIG. 5 is a diagram showing logical links established by the expert system between the data used to solve a given problem which is one of different problems presenting simultaneously or virtually simultaneously in the telecommunication network.

FIG. 5 is a diagram showing the tree of data for processing a given problem 61. The information relating to the problem 61 comprises:

a set 62 of messages identified as significant events relating to the problem 61 by the filter module 21;

a set 63 of actions 64 decided on by the command module 40, usually involving starting of local maintenance software for detecting and locating faults in a switching center;

a set 65 of results 66 supplied by the specialists 45, . . ., 46; and a set 67 of man-machine communication (MMC) actions 68 constituting messages between the expert system and a human expert or the repair personnel.

The graphical interface 25 enables a human operator (maintenance expert or repair personnel) to monitor continuously the behavior of the telecommunication network and where applicable to arrive at a diagnosis. In particular it can display the reasoning tree: each problem being analyzed is identified by its stamp and is represented as a node of the tree. Each node is linked dynamically to subnodes representing information associated with the problem under consideration. Because many problems may be analyzed simultaneously several nodes and the associated subnodes may be displayed simultaneously on the screen. The graphical interface 25 also enables the human expert to scan through all other data in the database, in particular that supplied in the form of a balance by the expert assistant module 24. When the processing of a problem is completed this tree, which links all problem processing data, is archive stored even if no solution has been found to the problem.

Because the storage capacity of the database 22 is limited there is a risk of saturation. To avoid saturation software not shown in the figures is run periodically to clear from the database 22 maintenance messages and other archive stored data. The data to be retained is chosen according to its importance for a human expert potentially interrogating the database in order to carry out a more detailed analysis of some unsolved problems.

In this embodiment the database 22 is the ONTOS object-oriented database marketed by ONTOS CORPORATION. The graphical interface 25 is written using the MIT (Massachusetts Institute of Technology) X WINDOW system. The operator commands and reports are implemented using the MOTIF software marketed by OPEN SOFTWARE FOUNDATION.

The expert system may be installed, for example, on a SUN 4/40 SPARCSTATION with 24 Mbytes of memory using ATT's UNIX operating system.

The command module 40, the input messages, the filter module 21, the expert assistant module 24, the heuristics rules, the specialists 45, . . . , 46 and the network model are written in ATT's C++ object-oriented language. The writing of this software is within the competence of the man skilled in the art, given the above functional description.

The expert system in accordance with the invention may be applied to any telecommunication network having a maintenance network: a conventional telecommunication network or an "intelligent network" type telecommunication network in which service control functions are centralized in dedicated machines separate from the switching machines in order to facilitate the modification of control functions, in particular the introduction of new services.

There is claimed:

1. Expert system for solving problems on the basis of a flow of input messages concerning the operation and the status of a network of machines while meeting real time constraints, said status changing with time, said system comprising:

filter means for detecting in realtime significant events on the basis of input messages, each significant event being a manifestation of a problem, as judged by a human expert;

a database for storing:
all input messages,
the significant events detected by the filter means,
intermediate data produced by the expert system,
a model of the network of machines, and
archives relating to problems processed previously, whether solved or not;

reasoning means for reasoning responsive to said filter means and to said database, said reasoning means comprising:

correlating means for determining whether a significant event detected in realtime by said filter means can be correlated with significant events previously detected by said filter means to thereby establish a new or updated common problem associated with a plurality of interrelated significant events having a possible common cause;

a plurality of specialists for processing part of the common problem, each comprising a subset of rules and knowledge provided by a human expert and being capable of executing in parallel without blocking each other; and command means responsive to each significant event detected in realtime by said filter means and also responsive to each new or updated common problem associated with a plurality of interrelated significant events established by said correlating means for selecting and executing specialists according to heuristic rules provided by a human expert and making a decision or declaring that a decision is impossible at the end of a predetermined time period in respect of a problem represented by significant events communicated to said reasoning means by said filter means;

a graphical interface for human/expert system communications; and expert assistant means for supplying a human expert with data stored in said database.

2. Expert system according to claim 1 wherein said filter means comprises means for:

distinguishing between different types of input messages;

counting messages of predetermined different types during sliding time periods of fixed duration; and detecting a significant event each time a count of messages exceeds a fixed threshold.

3. Expert system according to claim 1 wherein:

said input messages, said expert assistant means, said filter means, said command means, said specialists, said heuristic rules and said network model are implemented by a computer operating under the control of software written in an object-oriented language; and said database is an object-oriented database.

4. Expert system according to claim 1 wherein at least some items of data stored in said database are associated with a respective problem stamp; and said correlating means comprises means for using said problem stamp as an access key to access a respective said item of data.

* * * * *